(12) United States Patent
Yoon et al.

(10) Patent No.: US 8,314,854 B2
(45) Date of Patent: Nov. 20, 2012

(54) APPARATUS AND METHOD FOR IMAGE RECOGNITION OF FACIAL AREAS IN PHOTOGRAPHIC IMAGES FROM A DIGITAL CAMERA

(75) Inventors: Je-Han Yoon, Seongnam-si (KR); Hyun-Soo Kim, Yongin-si (KR); Ji-Hyo Lee, Yongin-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 944 days.

(21) Appl. No.: 12/197,566

(22) Filed: Aug. 25, 2008

(65) Prior Publication Data

US 2009/0051787 A1 Feb. 26, 2009

(30) Foreign Application Priority Data

Aug. 23, 2007 (KR) ........................ 10-2007-0085125

(51) Int. Cl.
*H04N 5/76* (2006.01)
(52) U.S. Cl. .................... 348/231.3; 348/222.1; 348/172
(58) Field of Classification Search .. 348/231.99–231.9, 348/333.02, 33.03, 333.11, 333.12, 222.1, 348/170–172; 382/155, 159, 160, 165, 192–194
See application file for complete search history.

(56) References Cited

U.S. PATENT DOCUMENTS

| 2003/0063781 A1* | 4/2003 | Philomin et al. | 382/118 |
| 2004/0008906 A1* | 1/2004 | Webb | 382/306 |
| 2009/0135269 A1* | 5/2009 | Nozaki et al. | 348/222.1 |
| 2009/0263022 A1* | 10/2009 | Petrescu et al. | 382/195 |

FOREIGN PATENT DOCUMENTS

WO  WO 2007060980 A1 *  5/2007

* cited by examiner

*Primary Examiner* — Nelson D. Hernández Hernández
(74) *Attorney, Agent, or Firm* — Cha & Reiter, LLC

(57) ABSTRACT

Disclosed is an apparatus for photographing an image using a digital camera capable of providing a preview image, including: an image sensor for capturing an image of a subject; a first image signal processor for processing at least one captured image as a sequent image in order to display the captured image as a preview image on a display window and detecting a face area from the captured image; a buffer for storing the image including at least one detected face area; a capture button for capturing a still image during outputting the sequent image as the preview image on the display window; a second image signal processor for processing the captured still image using the capture button; a controller for controlling to store the captured still image and information related on the face area detected from the first image signal processor prior to the input of the capture button; and a memory for storing the processed still image together with the information related on the detected face area.

20 Claims, 3 Drawing Sheets

APPARATUS AND METHOD FOR IMAGE RECOGNITION OF FACIAL AREAS IN PHOTOGRAPHIC IMAGES FROM A DIGITAL CAMERA

CLAIM OF PRIORITY

This application claims the benefit of an earlier patent application entitled "Apparatus and Method for Photographing Image Using Digital Camera Capable of Providing A Preview Image," filed in the Korean Intellectual Property Office on Aug. 23, 2007 and assigned Serial No. 2007-0085125, the content of which are hereby incorporated by reference.

BACKGROUND OF THE INVENTION

1. Field of the Invention

The present invention relates to a system and a method of photographing an image and automatically classifying the image, and more particularly to a system and a method of automatically classifying a facial image for each person, which includes a scheme for photographing images for classification and a scheme for classifying images.

2. Description of the Related Art

Due to a recent wide usages of a digital camera and a personal blog, a scheme is used in which an image photographed directly by a user is semi-automatically classified. In general, the scheme classifies the image for each person, or in reference to a scene or a background, such as the mountain and the sea. Here, the scheme for recognizing a face in the image and classifying the image requires registering many facial images for recognition in advance. Otherwise, there would be many errors, especially, in a case where the facial image is not a frontal image, or the facial image includes various facial expressions. That is, the photographed facial images with a natural pose include a face shape with various angles, but a rate of face recognition is lowered in the case of a non-front facial image, so that it is difficult to secure the accuracy of classification.

SUMMARY OF THE INVENTION

Accordingly, the present invention has been made to solve the above-mentioned problems occurring in the prior art and provides additional advantages, by providing an apparatus and a method for photographing and classifying a facial image while removing errors on recognizing and classifying the photographed image so as to accurately classify the image.

In accordance with an aspect of the present invention, an apparatus for photographing an image using a digital camera capable of providing a preview image includes: an image sensor for capturing an image of a subject; a first image signal processor for processing at least one captured image as a sequent image in order to display the captured image as a preview image on a display and detecting a face area from the captured image; a buffer for storing the image including at least one detected face area; a capture button for capturing a still image using outputting the sequent image as the preview image on the display window; a second image signal processor for processing the captured still image using the capture button; a controller for controlling to store the captured still image and information related on the face area detected from the first image signal processor prior to the input of the capture button; and a memory for storing the processed still image together with the information related on the detected face area.

In accordance with another aspect of the present invention, a method for photographing an image using a digital camera capable of providing a preview image includes: capturing at least one image of a subject; processing at least one captured image as a sequent image in order to display the captured image as a preview image on a display window; detecting a face area from the captured image, and storing the detected face area; capturing a photographed still image using a predetermined capture button; and storing the processed still image together with information related on the detected face area.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Figure 1:
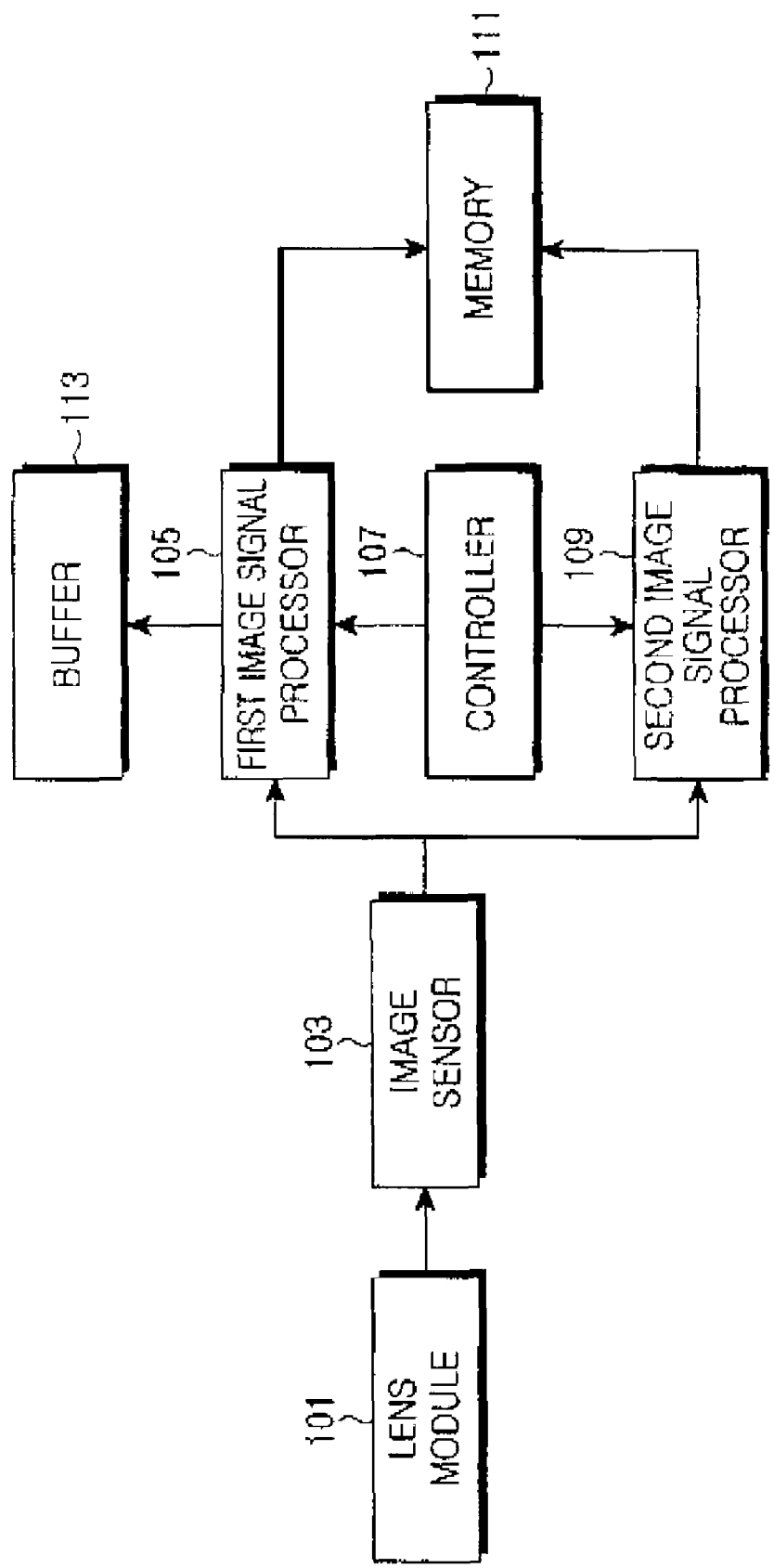
FIG. 1 is a diagram illustrating an apparatus of photographing an image according to an exemplary embodiment of the present invention.

Hereinafter, exemplary embodiments of the present invention will be described with reference to the accompanying drawings. In the following description, the same elements will be designated by the same reference numerals although they are shown in different drawings. For the purposes of clarity and simplicity, detailed explanation of known related functions and constitutions may be omitted to avoid unnecessarily obscuring the subject manner of the present invention.

FIG. 1 is a diagram illustrating an apparatus of photographing an image according to an exemplary embodiment of the present invention. As shown in FIG. 1, the inventive apparatus of photographing the image includes a lens 101, an image sensor 103, a first image signal processor 105, a controller 107, a memory 111, a buffer 113, and a second image signal processor 109.

The lens 101 optically receives an image of a subject. If the lens were included in a camera photographing the still image, the lens optically receives a still image as it is. If the lens were included in a camcorder photographing a moving image, the lens classifies the moving image into a plurality of still image and optically receives the still images in sequence. The image sensor 103 converts the image optically inputted by the lens 101 into an electrical signal. The second image signal processor 109 processes the electric signal converted-image based on a frame unit.

The memory 111 stores a photographed picture. The controller 107 shifts the lens 101 for adjusting focus on the subject.

The first image signal processor 105 selects the image including a face among the images processed based on the frame unit, determines the image, classifies, and stores the image. The classified facial image is stored in the buffer 113. The description of the first image signal processor 105 will be described in details.

Even though not shown in the figures, the apparatus for photographing the image can further include a display unit capable of outputting the photographed image and have a function of providing a preview image. That is, the inventive apparatus for photographing the image is also equipped with the ability to provide preview images during a predetermined time period before and after a point of time of capturing in an image.

Figure 2:
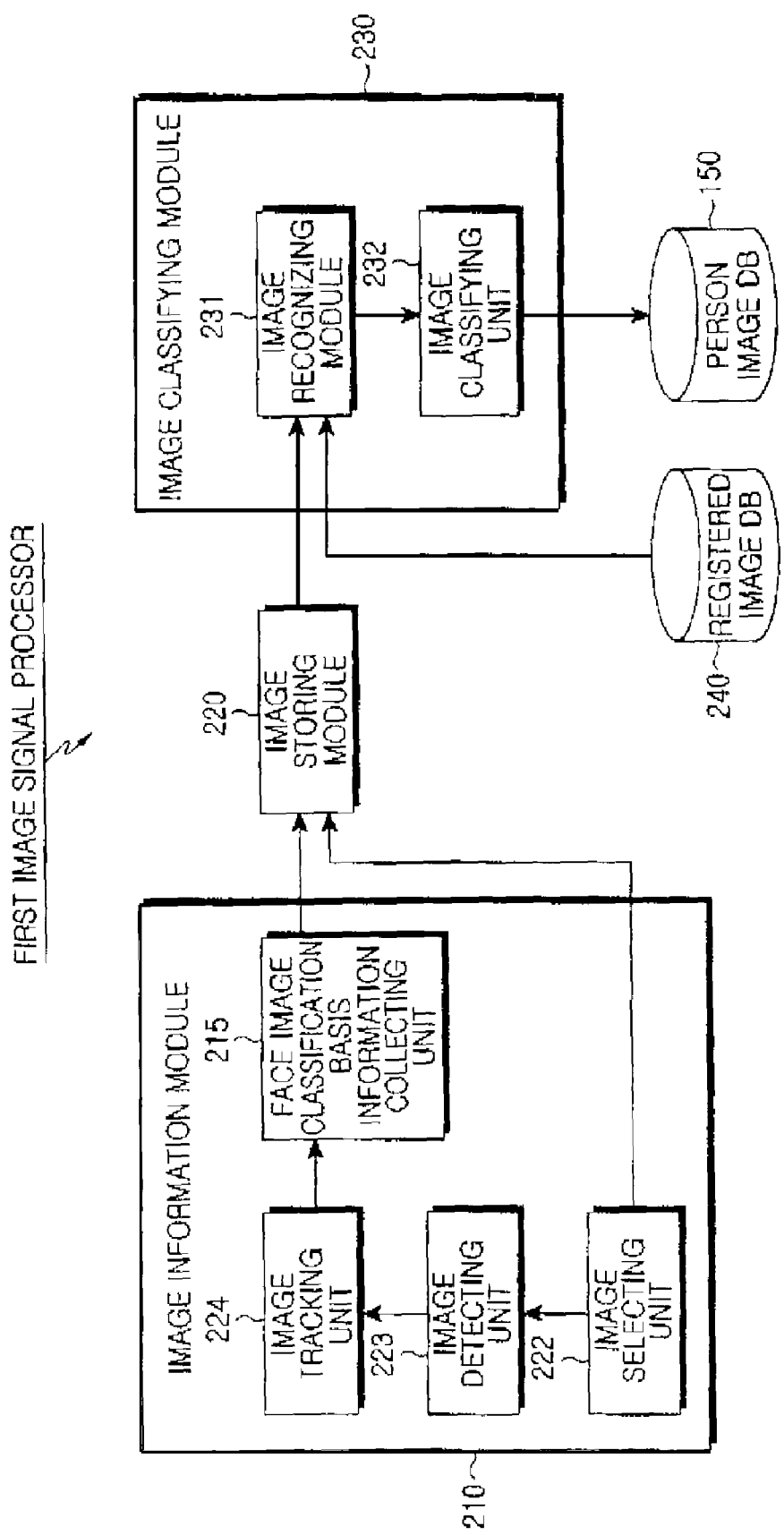
FIG. 2 is a diagram illustrating an image information unit and an image classifying unit according to an exemplary embodiment of the present invention.

FIG. 2 is a diagram illustrating an image information unit and an image classifying unit according to an exemplary embodiment of the present invention. As shown, the first image signal processor 105 includes an image information unit 210 and an image classifying unit 230. Note that FIG. 2 illustrates a state where the facial image is received from the camera and the connection state of each element. More particularly, the inventive apparatus for photographing image includes the image information unit 210, an image storing unit 220, and an image classifying unit 230, and further includes a registered image DB 240, and a person image DB 250. Hereinafter, the configuration and operation thereof will be described, respectively.

The image information unit 210 photographs the image, extracts a specific area from the image, and collects information for classifying the extracted specific area according to a predetermined reference. In the present exemplary embodiment, the image information unit 210 photographs a facial image and extracts a face area. In order to classify the extracted face area for each person, the image information unit 210 collects facial image classification basis information from the extracted face area. To this end, the image information unit 210 includes an image selecting unit 222, an image detecting unit 223, an image tracking unit 224, and a facial image classification basis information collecting unit 215. The description of each configuration is as follows.

The image selecting unit 222 selects the facial image received from the image signal processor of a camera module. The image selecting unit 222 selects not only the image selected by the activation of the shutter of the camera, but also a predetermined number of preview images provided by the camera during before and after. The predetermined number of preview images can be determined by the user in advance. Note that the image can be passively selected by the user, or controlled to be automatically selected. For example, the user predetermines the number of preview images to be "5", presses the shutter of the camera, and photographs the image. Here, the preview images are provided continuously before and after the photographing time point. The image selecting unit 212 selects not only the photographed image, but also the predetermined number of preview images photographed before and after the photographing time point. Since the predetermined number of preview images is set to be "5" in the present exemplary embodiment for illustrative purposes, the image selecting unit 212 selects and extracts the photographed image, two preview images right before the photographing time point, and two preview images right after the photographing time point. Therefore, a total of five images are selected and extracted, which are the facial images used for collecting the facial image classification basis information in the facial image classification basis information collecting unit 215 described later.

The image detecting unit 223 detects a facial area from the facial images selected in the image selecting unit 222. Here, the face area can be detected by using the distribution of facial colors in the image, or by an active contour of the face, such as eyes, the nose, the mouth, or the like. Note that various methods known in the artisians can be applied to detect the face area.

The image tracking unit 22 tracks the movement of the face area detected in the image detecting unit 22. That is, as shown in the above, the selected 5 facial images are the serial images, so that the face area moves when the person in the image moves. Therefore, the moving face area is tracked through the image tracking unit 224 It is reliable that the face areas detected according to the above tracking scheme are the face areas of the same person. In order to track the image, a tracking apparatus, such as a Kalman filter, or the like, can be employed by using the position similarity or the characteristic similarity between a present face and a previous face. The collected facial images for the same person are provided to the facial image classification basis information collecting unit 215.

The facial image classification basis information collecting unit 215 collects information for classifying the facial images from the facial images of the same people collected in the image tracking unit 214 for each corresponding person according to a predetermined reference. The facial image classification basis information can include all information available for classifying the facial image for each person, e.g. information obtained through recognizing the image of the face area for comparing the pre-registered image, or Principle Component Analysis (PCA) feature vector. When a plurality of face areas are detected from a specific facial image, the facial image classification basis information collecting unit 215 can collect facial image classification basis information for each face area. That is, when three face areas are detected and tracked in the facial image, the facial image classification basis information is collected for every detected and tracked face area. In this case, the image classifying module 230 described later classifies the same image as each facial image of three people. The image storing module 220 stores the facial image and the preview images selected in the image selecting unit 222 together with the facial image classification basis information collected from them. The facial image and the preview images and the facial image classification basis information are provided to the image classifying module 230.

The image classifying module 230 recognizes the facial images selected among the images photographed in the image information unit 210, and classifies the recognized facial images according to the predetermined reference. The classification of tracked face area according to predetermine reference can be classified into a person individually or a group. The image classifying unit 230 is related to a classifying scheme through the image recognition. The image classifying module 230 includes an image recognizing unit 231 and an image classifying unit 232, whose descriptions are as follows.

The image recognizing unit 231 recognizes the facial image and the preview image provided from the image storing unit 220 by using the facial image classification basis information. A lot of schemes for recognizing the facial image have existed conventionally, and in the present invention, the face shape can be recognized using the Support Vector Machine (SVM) or the artificial neural network.

In the meantime, the image classifying unit 232 classifies the facial image recognized in the image recognizing unit 231 for the corresponding person so as to store them in the facial image DB 250. More particularly, the image classifying unit 232 compares the facial image classification basis information with the information extracted from the facial image previously registered in the registered image DB 240, retrieves the person corresponding to the facial image and classifies the facial image for the corresponding person. If the registered facial image corresponding to the recognized facial image does not exist in the registered image DB 240, the image classifying unit 132 classifies the recognized facial image as be a non-classified facial image so as to store it to the registered image DB 240.

The afore-described each module and DB can be unified into a unit. However, the module, i.e. the image information unit 210, the image storing unit 220, and the image classifying unit 230 can be separated, respectively. For example, the image information unit 210 may be achieved by a camcorder, the image storing unit 220 may be achieved by a separate storing unit, and each of the image classifying module 230, the registered image DB 240, and the person image DB 150 may be achieved by either a separate unit or software installed in the computer.

In the meantime, the inventive apparatus can be designed to classify the image based on the reference of the mountain, the sea, the river, or the like, other than the facial image. The classification reference can be varied depending on the design.

Figure 3:
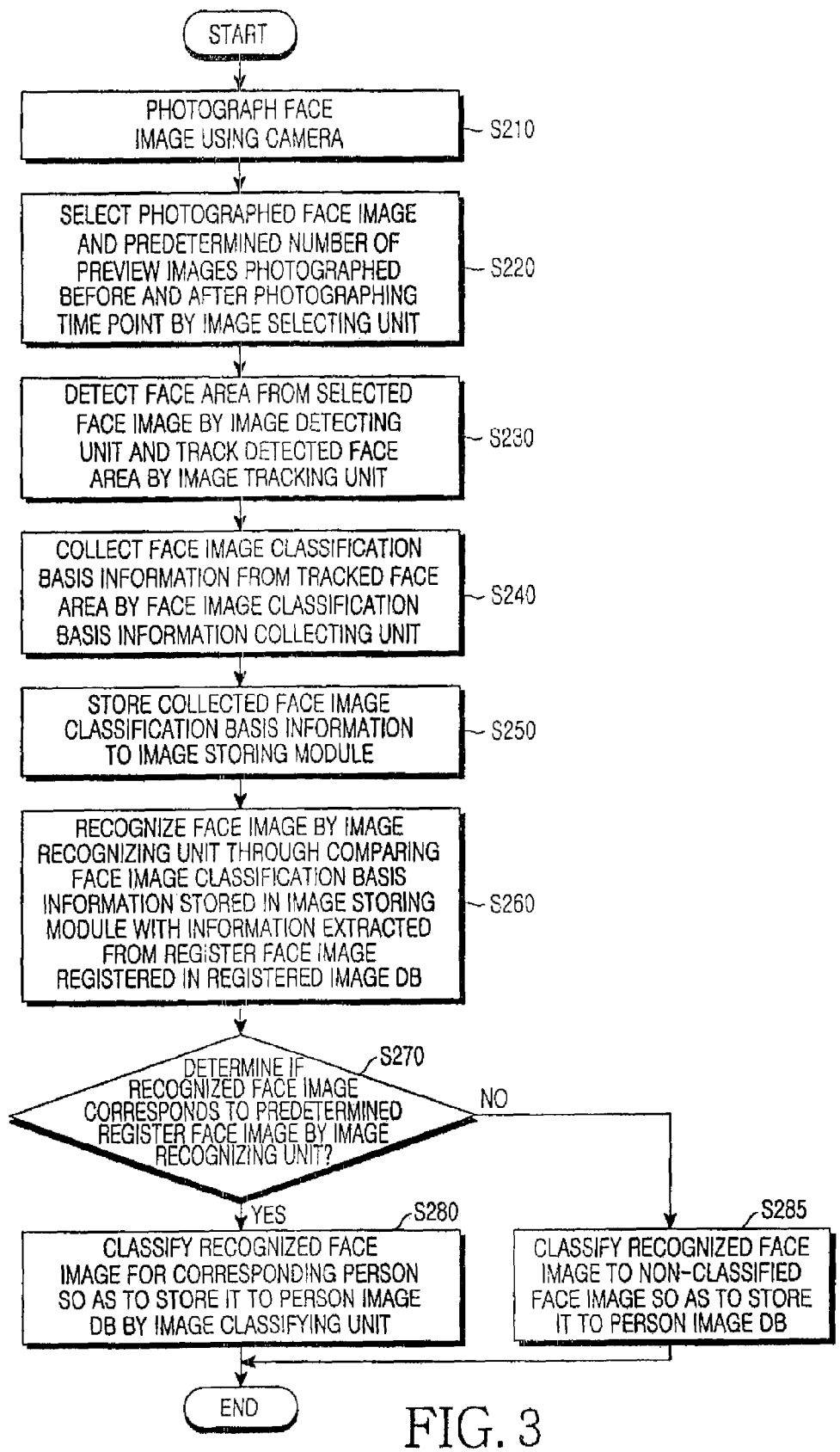
FIG. 3 is a flowchart illustrating a method for photographing and classifying a facial image according to an exemplary embodiment of the present invention.

FIG. 3 is a flowchart illustrating a method for photographing and classifying the facial image according to an exemplary embodiment of the present invention. Referring to FIG. 3, the facial image is photographed by using the camera S310. Then, the image selecting unit 222 selects and extracts the photographed facial image and the predetermined number of preview images photographed before and after the photographing time point S320. The image detecting unit 223 detects the face area from the facial image, and the image tracking unit 224 tracks the movement of the face area in the detected face area S330. In this step, when the facial images include a plurality of people, a plurality of face areas can be separately detected and tracked. Alternatively, the plurality of face can be classified into a group.

In the meantime, the facial image classification basis information collecting unit 215 collects the respective facial image classification basis information in the detected and tracked face areas S340. The facial image classification basis information is basis information for classifying the facial images for each corresponding person. Next, the facial image and the preview images selected by the image selecting unit 222, and the facial image classification basis information collected by the facial image classification basis information collecting unit 215, are stored in the image storing module 220 S350. Then, the facial image classification basis information is compared with the information extracted from the registered facial image previously registered in the DB 240, so that the selected facial image is recognized S360. Consequently, it is determined that the facial image recognized in the image recognizing unit 231 belongs to which registered facial image among the facial images previously registered in the registered image DB 240 S370. If the selected facial image has been previously registered, the image classifying unit 232 classifies the selected facial image as the facial image of the registered facial image, then stores the classified facial image to the facial image DB 150 S380. However, if the selected facial image has not been previously registered, the image classifying unit 232 classifies the selected facial image as the non-classified facial image, so as to store the non-classified facial image to the facial image DB 150 S385 as a new entry.

As seen above, the present invention is effective in removing errors in recognition and classification of the photographed image, and in accurately classifying the photographed image according to a predetermined reference scheme. Especially, even though the non-front facial image with various angles due to the natural movement is photographed, the person can be accurately recognized and classified by the facial image classification basis information extracted from the facial image of the photographing time point and the preview images photographed before and after the photographing time point. Further, even if the user has registered a small number of facial images for recognizing the face, simulation can be performed based on the facial image classification basis information extracted from the photographed image and the predetermined number of preview images photographed before and after the photographing time point and stored together with the photographed image. Therefore, the system and method for photographing an image and classifying the image according to the present invention can increase the recognition rate of the face shape and the accuracy of the classification, as if the recognition were performed with a lot of registered facial images.

As described above, the input method, the configuration of the apparatus, and its action in the mobile communication terminal having the touch screen can be implemented according to the exemplary embodiment of the present invention. While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for photographing a subject using a digital camera having a display window, comprising:
   an image sensor for capturing a predetermined plurality of images of a subject, including images of a face of the subject, for a predetermined time period;
   a first image signal processor for processing the predetermined plurality of images in order to display at least one of the predetermined plurality of images as a preview image on the display window, wherein the first image signal processor includes:
      an image selecting unit for selecting the predetermined plurality of images including respective face areas therein for a predetermined time period;
      an image detecting unit for detecting every face area selected in the image selecting unit; and
      an image tracking unit for tracking a motion of every face area detected in the image detecting unit in order to search for an identical face;
   a buffer for storing the preview image including the corresponding detected face area;
   a capture button for capturing a still image during outputting of the preview image on the display window;
   a second image signal processor for processing the captured still image in response to the capture button;
   a controller for controlling to store the captured still image and information related to the detected face area detected from the first image signal processor prior to the activation of the capture button; and
   a memory for storing the processed still image together with the information related on the detected face areas.

2. The apparatus as claimed in claim 1, wherein the first image signal processor detects the information related to the detected face area from the predetermined plurality of images, processes the detected information, and stores the processed information in the buffer.

3. The apparatus as claimed in claim 2, wherein the first image signal processor captures the predetermined plurality of images by a start of a semi-shutter operation of the capture button so as to detect the information related to the detected face area.

4. The apparatus as claimed in claim 1, wherein the controller classifies the information related to the detected face area from the predetermined plurality of images including the detected face area.

5. The apparatus as claimed in claim 1, wherein the first image signal processor comprises:
   a facial image classification basis information collecting unit for collecting facial image classification basis information from the detected face area corresponding to an identical person collected in the image tracking unit according to a predetermined reference.

6. The apparatus as claimed in claim 5, wherein the facial image classification basis information includes an image of the tracked face area or Principle Component Analysis (PCA) feature vectors.

7. The apparatus as claimed in claim 1, wherein the image detecting unit detects the face areas using a spread of a skin color or an active contour of the face areas.

8. The apparatus as claimed in claim 1, wherein the first image signal processor further comprises:
   an image recognizing unit for recognizing the face areas; and
   an image classifying unit for classifying the recognized facial areas as belonging to the subject so as to provide a classified facial image.

9. The apparatus as claimed in claim 8, wherein the image recognizing unit recognizes the facial areas using a Support Vector Machine (SVM) or an artificial neural network.

10. The apparatus as claimed in claim 8, wherein the memory further comprises a registered image database for storing the classified facial image as a registered facial image.

11. The apparatus as claimed in claim 8, wherein the memory further comprises a person image database for storing the classified facial image for the corresponding person.

12. A method for photographing a subject using a digital camera having a display window, the method comprising:
   capturing a predetermined plurality of the images of a subject, including images of a face of the subject, for a predetermined time period;
   processing the predetermined plurality of images in order to display at least one of the predetermined plurality of images as a preview image on the display window, wherein the processing includes:
      selecting the predetermined plurality of images including respective face areas therein for the predetermined time period;
      detecting every face area in the selected predetermined plurality of images; and
      tracking a motion of every detected lace area in order to search for an identical face of the photographed person;
   capturing a photographed still image using a predetermined capture button; and
   storing the processed still image together with information related on the detected face areas.

13. The method as claimed in claim 12, further comprising:
   comparing information related on the collected face areas with information extracted from a pre-registered facial image of the face of the subject, and recognizing the photographed facial image of the subject;
   determining if the pre-registered facial image corresponding to the recognized facial image has been already registered; and
   classifying the recognized facial image as belonging to the subject to store the recognized facial image if the registered facial image corresponding to the recognized facial image has been already registered, and classifying the recognized facial image into a non-classified facial image to store the recognized facial image if the registered facial image corresponding to the recognized facial image has not been already registered.

14. The method as claimed in claim 13, wherein the step of recognizing the photographed facial image of the subject is implemented using a Support Vector Machine (SVM) or an artificial neural network.

15. The method as claimed in claim 12, wherein the face areas are detected using a spread of skin color or an active contour of the face areas.

16. The method as claimed in claim 12, wherein the information related to the collected face area includes an image of the tracked face areas or Principle Component Analysis (PCA) feature vectors.

17. The method as claimed in claim 12, wherein the processing includes collecting facial image classification basis information from the face area corresponding to an identical person collected according to a predetermined reference.

18. A method for photographing an image using a digital camera capable of providing a preview image, the method comprising:
   capturing at least one image of a subject;
   processing at least one captured image as a sequent image in order to display the captured image as a preview image on a display window, detecting a face area from the captured image, and storing the detected face area, wherein the processing includes:
      selecting a predetermined number of images including the face area among the at least one captured image for a predetermined time period;
      detecting every face area from the selected images; and
      tracking a motion of every face area detected to search for an identical face and collecting facial image classification basis information from the face area corresponding to an identical person collected according to a predetermined reference;
   capturing a photographed still image using a predetermined capture button; and
   storing the processed still image together with information related on the detected face area.

19. The method as claimed in claim 18, wherein the face area is detected using a spread of skin color or an active contour of the face area.

20. The method as claimed in claim 18, wherein the information related on the collected face area includes an image of the traced face area or Principle Component Analysis (PCA) feature vectors.

* * * * *

UNITED STATES PATENT AND TRADEMARK OFFICE
CERTIFICATE OF CORRECTION

PATENT NO. : 8,314,854 B2
APPLICATION NO. : 12/197566
DATED : November 20, 2012
INVENTOR(S) : Je-Han Yoon et al.

It is certified that error appears in the above-identified patent and that said Letters Patent is hereby corrected as shown below:

In the Claims:

Column 6, Claim 1, Lines 53-54 should read as follows:
--...the detected face areas detected from...--

Column 7, Claim 5, Line 9 should read as follows:
--...detected face areas corresponding...--

Column 7, Claim 6, Line 14 should read as follows:
--...tracked face areas or Principal Component Analysis (PCA)...--

Column 7, Claim 12, Line 49 should read as follows:
--...every detected face area in...--

Signed and Sealed this
Twenty-third Day of April, 2013

Teresa Stanek Rea
*Acting Director of the United States Patent and Trademark Office*